United States Patent [19]

Iwai et al.

[11] 3,933,719

[45] Jan. 20, 1976

[54] POLYCHLOROPRENE-BASE ADHESIVE COMPOSITION

[75] Inventors: Sakuya Iwai, Tokyo; Takao Hirose, Kamakura, both of Japan

[73] Assignee: Nippon Oil Company Ltd., Tokyo, Japan

[22] Filed: Mar. 1, 1974

[21] Appl. No.: 447,160

[30] Foreign Application Priority Data

Mar. 7, 1973 Japan............................... 48-26738

[52] U.S. Cl.....................260/31.2 MR; 260/31.2 R; 260/33.6 A; 260/33.6 UA; 260/33.8 UA; 260/42; 260/42.47; 260/82; 260/844; 260/845; 260/890

[51] Int. Cl.².... C08K 5/01; C08K 5/02; C08K 5/10

[58] Field of Search................260/31.2 MR, 33.6 A, 260/33.8 UA, 31.2 R, 33.6 UA, 82

[56] References Cited
UNITED STATES PATENTS

| | | | |
|---|---|---|---|
| 2,753,326 | 7/1956 | Hamner | 260/82 |
| 2,862,914 | 12/1958 | Leary et al | 260/82 |
| 3,505,300 | 4/1970 | Galloway | 260/82 |
| 3,753,963 | 8/1973 | Hayashi | 260/82 |
| 3,778,421 | 11/1973 | Hayashi et al. | 260/82 |

*Primary Examiner*—Donald E. Czaja
*Assistant Examiner*—H. H. Fletcher
*Attorney, Agent, or Firm*—Flynn & Frishauf

[57] ABSTRACT

A polychloroprene-base adhesive composition having a long retention time of tackiness without lowering of adhesive strength, which consists of:

(1) resinous material having a softening point of 145°C or higher being obtained by polymerization of a cracked oil fraction; (2) polychloroprene; (3) additives such as metallic oxides and antioxidants; (4) conventional additive resins, if necessary; and (5) volatile organic solvent.

8 Claims, 2 Drawing Figures

POLYCHLOROPRENE-BASE ADHESIVE COMPOSITION

BACKGROUND OF THE INVENTION

This invention relates to a polychloroprene-base adhesive. More particularly, the invention relates to a novel and improved polychloroprene-base adhesive which consists of: (1) resinous material having a softening point of 145°C or higher which is obtained by polymerizing cracked oil fractions of crude petroleum or its distillation products; (2) polychloroprene; (3) known additives for polychloroprene such as metallic oxides and antioxidants; (4) known resins added to polychloroprene-base adhesive such as alkylphenol resin and coumarone-indene resin, if necessary; and (5) volatile organic solvents.

Generally speaking, the polychloroprene-base adhesives have good adhesive strength, and in addition, they have excellent weather resistance, aging resistance, alkali resistance and so forth. Furthermore, they can be applied to a wide variety of substrates to be adhered. So that, the polychloroprene-base adhesives are advantageous in use as compared with several natural rubber-base adhesives, vinyl acetate-base adhesives and methacrylic ester-base adhesives.

For this reason, the polychloroprene-base adhesives are widely employed in the manufacturing industries; however, in the practical use of the adhesives, the retention time of tackiness of the adhesive as used has a very important significance in the adhesion process. That is, when an adhesive having a long retention time of tackiness is used, the open time after the application of adhesive to the bonding step can be extended because, even when the articles are not joined together just after the application of the adhesive, the adhesive strength does not decrease. This fact is very advantageous not only in the convenience during the adhesion process but also in the elimination of the scattering of adhesive strength owing to the changes of open time.

With regard to the retention time of tackiness, the polychloroprene-base adhesives in the prior art have not been satisfactory for the industrial purposes. While, in order to extend this retention time of tackiness, it has been proposed to add thermoplastic resin such as coumarone-indene resin, terpenephenol resin glycol ester of hydrogenated wood rosin and petroleum resins having lower softening points into the polychloroprene-base adhesives, however, such addition is liable to cause the lowering adhesive strength by the decrease of cohesive force.

BRIEF SUMMARY OF THE INVENTION

In view of the aforementioned facts, the principal object of the present invention is to propose a novel and improved polychloroprene-base adhesive composition.

Further object of the present invention is to propose such adhesive composition which is able to elimate the above-mentioned disadvantages.

Still further object of the present invention is to propose the polychloroprene-base adhesive composition, the tackiness of which can be largely extended without causing the lowering of cohesion, thereby providing large adhesive strength.

Pursuant to the above objects, the polychloroprene-base adhesive of the present invention consists of: (1) resinous material having a softening point of 145°C or higher which is obtained by polymerizing cracked oil fraction obtainable, as by-products, in the production of ethylene, propylene, butene and butadiene from naphtha, kerosene, light oil or crude oil through catalytic cracking or thermal cracking such as steam cracking, vapor phase thermal cracking and sand cracking; (2) polychloroprene; (3) known additives for polychloroprene such as metallic oxides and antioxidants; (4) known resins for the polychloroprene-base adhesive such as alkylphenol resin, coumarone-indene resin, terpene-phenol resin and polyterpene resin, if necessary; and (5) volatile organic solvents.

BRIEF DESCRIPTION OF THE DRAWINGS

These and other features of the invention will be more fully understood by referring to the following detailed description and examples with reference to the accompanying drawings, in which.

DETAILED DESCRIPTION OF THE INVENTION

Figure 1:
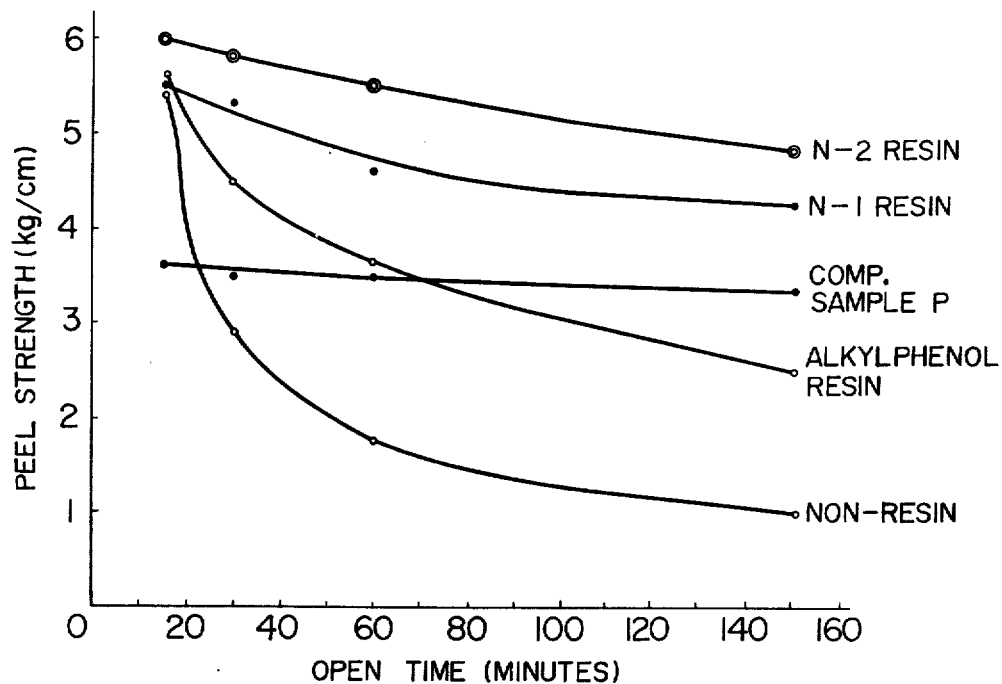
FIG. 1 and FIG. 2 are comparative diagrams of the adhesion properties of the adhesive compositions of the present invention.

As disclosed in the above, the resinous material having a softening point of 145°C or higher used in the present invention is prepared by polymerizing a cracked oil fraction which is obtained in the cracking of petroleum such as naphtha. More specifically, it may be industrially prepared by polymerizing a cracked oil fraction having a boiling point of 140° to 280°C or such fraction which being enriched with indene fraction in the presence of Friedel-Crafts catalyst, and as far as we understand now, the resinous material which is prepared by this method is most suitable in the present invention.

Further, in the present invention, a resinous material having a softening point of 145°C or higher which is prepared by thermally polymerizing a fraction of cyclopentadiene or its derivative such as dicyclopentadiene or a fraction which being enriched with such components, at a temperature of, for example, 250° to 350°C, can also be used. The softening point of the resinous material as used herein must not be lower than 145°C, and when a resin having a lower softening point than said temperature is used, the composition having strong adhesion can not be obtained as shown by the following comparative example.

The term "polychloroprene" referred in the present invention means polymers of chloroprene, and as such polymers, the commercially available products such as Neoprene (trademark made by Showa Neoprene Co., Ltd., Japan), Denka Chloroprene (trademark made by The Electro Chemical Industrial Co., Ltd., Japan) and Skyprene (trademark, made by Toyo Soda Manufacturing Co., Ltd., Japan) can be used.

The aforementioned metallic oxides are, for example, zinc oxide and oxides of alkaline earth metals such as magnesium oxide and calcium oxide. The antioxidants or aging inhibitors as used may be those generally employed for the ordinary polychloroprene rubber such as 2,6-di-tert-butyl-p-cresol, 2,2'-methylenebis(4-methyl-6-tert-butylphenol) and phenyl-β-naphthylamine.

The aforementioned volatile organic solvents are, for example, aromatic hydrocarbons such as toluene and xylene, chlorinated aliphatic hydrocarbon such as carbon tetrachloride, ethyl acetate, n-hexane or a mixture of them which dissolve the ordinary polychloroprene.

The preparation of the above-mentioned novel composition of polychloroprene-base adhesive may be carried out according to the commonly known method, which is disclosed, for example, in "Plastics", 23, (12), 107 - 120 (1972).

In the composition of the present invention, the compounding ratios of the above components are not especially restricted, while in general compositions, 1 to 70 parts by weight of component (1), 1 to 40 parts by weight of metallic oxide, 0 to 5 parts by weight of antioxidant, 0 to 70 parts by weight of component (4) and 100 to 1,000 parts by weight of component (5) may be used against 100 parts by weight of component (2). And the above compounding ratios may be preferably 20 to 50 parts by weight of component (1), 5 to 20 parts by weight of metallic oxide 1 to 3 parts by weight of antioxidant, 0 to 50 parts by weight of component (4) and 300 to 600 parts by weight of component (5) to 100 parts by weight of component (2).

In the following, the present invention will be further explained by Examples in which all parts and percentages are by weight unless otherwise indicated.

EXAMPLE 1

A cracked oil fraction (A) having a boiling range of 140° to 220°C which was obtained in the steam cracking of naphtha, was mixed with indene in the amounts as indicated in the following Table 1 to obtain starting mixtures. These mixtures were polymerized under the conditions of said Table 1, and after the polymerization, the catalyst was removed by washing with caustic soda aqueous solution and further rinsed with water. Then, unreacted oil and lower polymer were removed from the polymerization products by distillation to obtain aromatic hydrocarbon resins N-1 and N-2. The properties of said resins are also shown in the following Table 1.

tion which does not contain any resinous material was also prepared.

The adhesive properties of thus obtained adhesive compositions were tested, the results of which are shown in the accompanying FIG. 1. It will be understood from this diagram that the polychloroprene-base adhesive compositions of the invention using the resins N-1 and N-2 have longer retention time of tackiness as well as larger adhesive strength after the long open time.

The adhesion tests were carried out as follows. In each test, two sheets of cotton canvas were applied with each adhesive three times every 1 hour, and left as they stand. The time from the third application to the joining of said two sheets was referred to as "open time" in this specification. After the open time, the two sheets were joined together, and after further 48 hours, the peel strength was measured according to ASTM D-903-49. The speed of peeling was 50 mm/min, and the operations from the application of adhesive to the measurement of peel strength were carried out in an air-conditioned room at 23 ± 1°C

EXAMPLE 2

Figure 2:
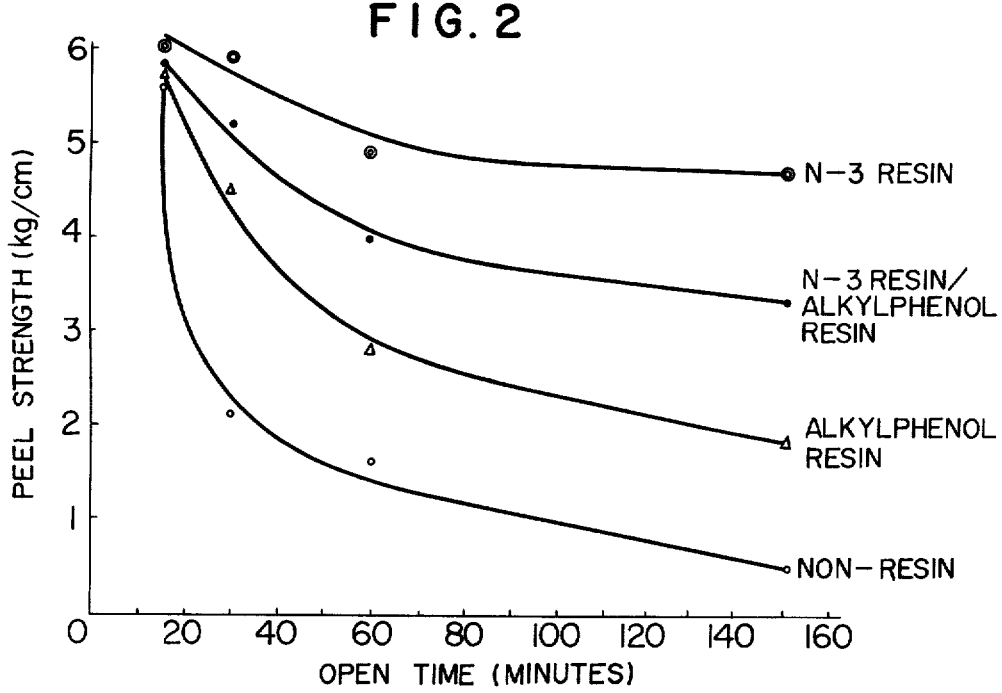

Five percent of indene and 0.8 % of boron trifluoride ethyl ether complex were added to the cracked oil fraction (A) as used in Example 1, and polymerized at 0°C for 7 hours, thus obtaining an aromatic hydrocarbon resin (N-3) having a softening point of 158°C and a bromine number of 20. Using the resin N-3, alkylphenol resin (Hitanol 2181) and an equal mixture of said two resins, adhesive compositions were prepared in like manner as the foregoing Example 1. Then, the adhesion tests were carried out, the results of which are shown in FIG. 2.

It will be understood from the figure that the polychloroprene-base adhesive composition of the present Table 1

| Resin | Starting Material | | Catalyst $BF_3.Et_2O$ as used (%) | Polymerization | | Properties of Resin | |
|---|---|---|---|---|---|---|---|
| | Cracked Oil (A) (%) | Indene (%) | | Temp. (°C) | Time (hr) | Softening Pt. (°C)*1 | Bromine Number *2 |
| N-1 | 95 | 5 | 0.8 | 10 | 5 | 151 | 21 |
| N-2 | 90 | 10 | 0.4 | 10 | 5 | 163 | 19 |
| Comp. Sample P | 100 | 0 | 0.8 | 10 | 5 | 121 | 24 |

*1Measured according to ring and ball method of Japanese Industrial Standard (JIS) K-2531.
*2Measured according to ASTM D-1158-57T.

Then, in the next step, 100 parts of Denka Chloroprene A-90 (trademark made by The Electro Chemical Industrial Co., Ltd., Japan) 5 parts of zinc oxide, 4 parts of magnesium oxide, and 2 parts of antioxidant (trademark: Nocrac 200, made by Ouchi-Shinko Chemical Industrial Co., Ltd., Japan) were well kneaded by a mixing roll. In the meantime, each 45 parts of said resin N-1, resin N-2, Comparative Sample P having a softening point of 121°C as disclosed in Table 1, and a thermal reaction type alkylphenol resin (Trademark: Hitanol 2182, made by Hitachi Chemical Co., Ltd., Japan) was mixed with 4 parts of magnesium oxide, 1 part of water and 450 parts of toluene at room temperature. And after 24 hours, each 111 parts of said kneaded mixture was added to each of the latter mixtures and mixed well, thereby adhesive compositions were prepared. For comparison, an adhesive composiinvention has not only a longer retention time of tackiness but also a larger adhesive strength as compared with the ordinary compositions. Further, it is understood that the retention time of tackiness of the adhesive composition which containing both of the resin N-3 and alkylphenol resin was clearly improved as compared with the adhesive composition containing only the alkylphenol resin.

It should be emphasized, however, that the specific examples described herein are intended as merely illustrative and in no way restrictive of the invention.

What is claimed is:

1. A polychloroprene-base adhesive composition which consists of:
   1. from 1 to 70 parts by weight of a resinous material containing indene and having a softening point of 145°C. or higher which is obtained by polymerizing a cracked fraction produced as a by-product of thermal or catalytic cracking of crude petroleum or petroleum distillates;
2. 100 parts by weight of a polychloroprene;
3. from 1 to 40 parts by weight of a metallic oxide selected from the group consisting of zinc oxide and an alkaline earth metal oxide;
4. 0 to 5 parts by weight of an antioxidant;
5. 0 to 70 parts by weight of an alkylphenol resin, coumarone-indene resin, terpenephenol resin or polyterpene resin; and
6. A volatile organic solvent selected from the group consisting of an aromatic hydrocarbon, a chlorinated aliphatic hydrocarbon, a lower alkyl ester of acetic acid, a saturated aliphatic hydrocarbon and mixtures thereof.

2. A polychloroprene-base adhesive composition as claimed in claim 1, in which said resinous material having a softening point of 145°C or higher is prepared by polymerization of a cracked oil fraction having a boiling range of 140° to 280°C in the presence of Friedel-Crafts catalyst.

3. A polychloroprene-base adhesive composition as claimed in claim 2, in which said cracked oil fraction is enriched with indene.

4. A polychloroprene-base adhesive composition as claimed in claim 1, in which said resinous material having a softening point of 145°C. or higher is prepared by thermally polymerizing a cracked oil fraction containing cyclopentadiene or derivative thereof, at a temperature of 250° to 350°C.

5. A polychloroprene-base adhesive composition of claim 1, in which 100 parts by weight of polychloroprene is mixed with 20 to 50 parts by weight of said resinous material, 5 to 20 parts by weight of said metallic oxide, 1 to 3 parts by weight of said antioxidant, 0 to 50 parts by weight of said resin (5) and 300 to 600 parts by weight of said volatile organic solvent.

6. A polychloroprene-base adhesive composition of claim 1 wherein said metallic oxide is zinc oxide, calcium oxide or magnesium oxide.

7. A polychloroprene-base adhesive composition of claim 1 wherein said antioxidant is 2,6di-tert-butyl-p-cresol, 2,2'-methylenebis(4-methyl-6tert-butylphenol) or phenyl-β-naphthylamine.

8. A polychloroprene-base adhesive composition of claim 1 wherein said resinous material comprises a cracked oil fraction having a boiling range of from 140°C. to 220°C.

* * * * *